(12) United States Patent
Greaves et al.

(10) Patent No.: US 7,904,536 B2
(45) Date of Patent: Mar. 8, 2011

(54) METHOD AND SYSTEM FOR REMOTE MANAGEMENT OF CUSTOMER SERVERS

(75) Inventors: Jon D. Greaves, Aldie, VA (US); William B. Bensten, Arlington, VA (US); Michael D. Seminaro, New York, NY (US); Christopher E. Mar, Leesburg, VA (US)

(73) Assignee: Oracle America, Inc., Redwood City, CA (US)

( * ) Notice: Subject to any disclaimer, the term of this patent is extended or adjusted under 35 U.S.C. 154(b) by 940 days.

(21) Appl. No.: 11/151,646

(22) Filed: Jun. 14, 2005

(65) Prior Publication Data
US 2005/0256883 A1 Nov. 17, 2005

Related U.S. Application Data

(63) Continuation-in-part of application No. 10/452,933, filed on Jun. 3, 2003, now abandoned.

(60) Provisional application No. 60/384,392, filed on Jun. 3, 2002.

(51) Int. Cl.
*G06F 15/173* (2006.01)
(52) U.S. Cl. ......................................................... 709/223
(58) Field of Classification Search .................. 709/223, 709/224, 230, 226, 239, 245, 229, 220, 227, 709/228, 203, 249, 232; 707/10, 9; 705/53, 705/57, 80, 1
See application file for complete search history.

(56) References Cited

U.S. PATENT DOCUMENTS

| 5,867,495 | A * | 2/1999 | Elliott et al. ............... 370/352 |
|---|---|---|---|
| 6,292,838 | B1 | 9/2001 | Nelson |
| 6,397,359 | B1 | 5/2002 | Chandra et al. |
| 6,404,743 | B1 | 6/2002 | Meandzija |
| 6,473,407 | B1 * | 10/2002 | Ditmer et al. ............... 370/252 |
| 6,490,620 | B1 * | 12/2002 | Ditmer et al. ............... 709/224 |
| 6,598,167 | B2 * | 7/2003 | Devine et al. ................... 726/8 |
| 6,909,708 | B1 * | 6/2005 | Krishnaswamy et al. ..... 370/352 |
| 7,225,249 | B1 * | 5/2007 | Barry et al. .................. 709/227 |
| 2002/0103878 | A1 * | 8/2002 | Moncibais .................. 709/217 |
| 2003/0154279 | A1 * | 8/2003 | Aziz .......................... 709/225 |
| 2005/0125519 | A1 * | 6/2005 | Yang et al. .................. 709/223 |

OTHER PUBLICATIONS

Haskell, Barry G., Puri, Atul, & Netravali, Arun. (1997). Digital Video: An Introduction to MPEG-2, p. 116-119, 136-142, New York: Chapman & Hall.*
International Search Report for PCT/US03/17264 mailed Oct. 23, 2003.

* cited by examiner

*Primary Examiner* — Jeffrey Pwu
*Assistant Examiner* — Saad A Waqas
(74) *Attorney, Agent, or Firm* — Marsh Fischmann & Breyfogle LLP; Kent Lembke; Jonathon A. Szumny (57) ABSTRACT

Embodiments of the invention are directed generally to a decentralization of security provisions, improved logging of textual and/or graphical data in the network management system, and/or the use of low-value keyboard, mouse, and compressed video data between the network management system and the managed network. An embodiment of the invention includes: a customer appliance coupled to the management server via a first link; and an interface to a managed device coupled to the customer appliance, the first link configured to transmit input/output (I/O) command signals from the management server to the customer appliance, the first link further configured to transmit compressed computer video screen information from the customer appliance to the management server.

14 Claims, 11 Drawing Sheets

METHOD AND SYSTEM FOR REMOTE MANAGEMENT OF CUSTOMER SERVERS

CROSS-REFERENCE TO RELATED APPLICATIONS

The present application is a Continuation-in-Part (CIP) of pending U.S. patent application Ser. No. 10/452,933, filed Jun. 3, 2003, now abandoned which claims priority under 35U.S.C. §119(e) to U.S. Provisional Patent Application No. 60/384,392, filed Jun. 3, 2002. U.S. patent application Ser. Nos. 10/452,933 and 60/384,392 are hereby incorporated by reference in their entirety. Two non-provisional U.S. Patent Applications, entitled "Method and System For Filtering and Suppression of Telemetry Data", U.S. patent application Ser. No. 11/151,665, and "Method and System for Relocating and using Enterprise Management Tools in a Service Provider Model", U.S. patent application Ser. No. 11/151,645, filed concurrently herewith, are hereby incorporated by reference in their entirety.

FIELD OF THE INVENTION

The present invention relates to the monitoring and management of devices or appliances using a network management system and the like.

BACKGROUND OF THE INVENTION

In the field of network management, various approaches are known for the remote monitoring and management of customer networks. That is, the network management system (and its associated tools) is located remotely from the managed customer network and devices. The advantage of this approach is that a third-party service provider is able to leverage management assets across multiple customer networks.

A typical approach to securing known network management systems is to deploy a bastion host in the support infrastructure. As the name suggests, the bastion host is relatively secure. Typically, the bastion host connects to the managed customer network via a Virtual Private Network (VPN) or similar link.

There are many disadvantages associated with the use of the bastion host and VPN link, however. For example, the bastion host provides a single point of vulnerability to attack: if a hacker defeats the security of the bastion host, the hacker may have direct access to one or more customer networks and their devices. In addition, known bastion hosts provide limited transactional audit capability, making breaches of security more difficult to detect and remedy. Moreover, the VPN links between the bastion host and the managed network typically consume relatively high bandwidth. As a result, either network management functions operate very slowly, or costly high-bandwidth links between the bastion host and the managed network are required.

What is needed is an improved system and method for remote network management that reduces security risks, provides improved audit and accountability controls for network management transactions, and decreases the bandwidth that is required between a network management system and the managed customer network.

SUMMARY OF THE INVENTION

Embodiments of the invention are directed generally to decentralized security provisions, improved logging of textual and/or graphical data in the network management system, and/or the use of low-value keyboard, mouse, and compressed video data between the network management system and the managed network.

An embodiment of the invention provides a system for managing a network, including: a management server; a customer appliance coupled to the management server via a first link; and an interface to a managed device coupled to the customer appliance, the first link configured to transmit input/output (I/O) command signals from the management server to the customer appliance, the first link further configured to transmit compressed computer video screen information from the customer appliance to the management server.

An embodiment of the invention provides a method for processing data in a network appliance, including: receiving a Nth frame of data from a managed device; receiving a Nth+1 frame of data from the managed device; determining changed pixel information based on a comparison of the Nth frame and the Nth+1 frame; and transmitting the changed pixel information from the managed device to a management server, the method decreasing bandwidth of communications between the network appliance and the management server.

An embodiment of the invention provides a method for processing data in a management server, including: receiving changed pixel information from a network appliance; generating a screen image based on the changed pixel information; and logging the screen image, the method decreasing bandwidth of communications between the network appliance and the management server, the method further facilitating an audit of a network management session.

An embodiment of the invention provides a method for initiating a communication session in a network including: displaying a list of customers in a customer list window of a graphical user interface (GUI); receiving a customer selection from a user based on the displayed list of customers; displaying a list of devices in a device list window of the GUI based on the customer selection; receiving a device selection from the user based on the list of displayed devices; and displaying device information in a device information window of the GUI based on the device selection, the method simplifying interaction with the user.

Embodiments of the invention also provide for processor-readable medium having instructions thereon to perform the aforementioned methods.

Advantageously, embodiments of the invention decrease security vulnerabilities, improve the accountability of network management actions, and/or decrease the amount of bandwidth required to support remote network management.

Additional features of the invention will be set forth in part in the description which follows, and in part will be obvious from the description, or may be learned by practice of the invention. The features of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
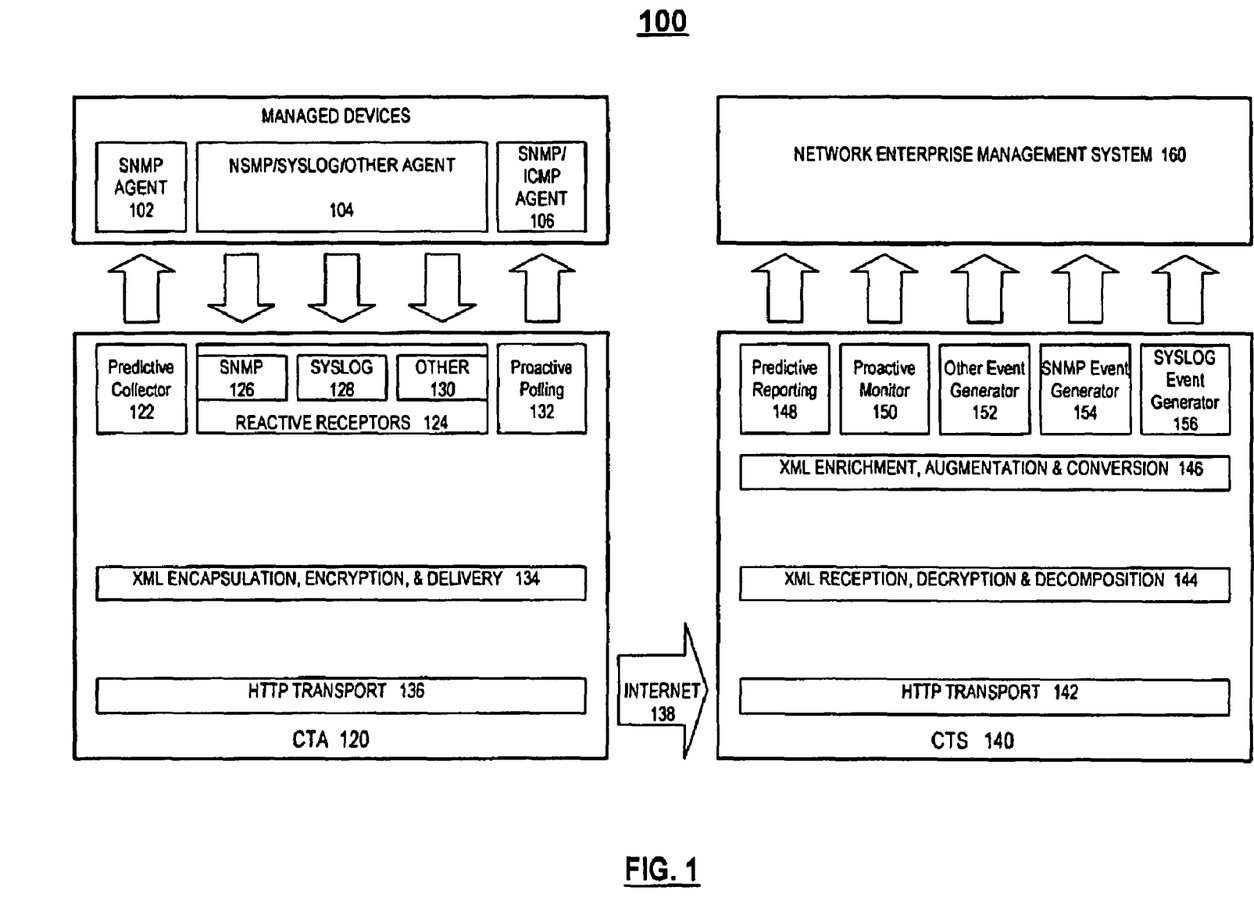
FIG. 1 illustrates the information flow and key components in one embodiment of the present invention.

FIG. 1 shows an information flow in accordance with some illustrative embodiments of the present invention. The event delivery system 100 in accordance with embodiments of the present invention may include two main components. First is a client receiver platform 120 (hereafter "control tower appliance" 120 or "CTA" 120) which is preferably a rack mountable platform deployed in a client cage which provides store and forward of event information and a secure management jump gate to reach client hosts. The CTA 120 may be deployed in one-to-one, one-to-many, or many-to-one configurations depending on customers/partners environment. Second is an event delivery server 140 (hereafter a "control tower server" 140 or "CTS" 140) which provides a unified and/or centralized event delivery mechanism for all CTAs and other future service platforms. The CTS 140 provides an extensible open standard based delivery platform of event information into core systems. A single CTS, such as CTS 140, will preferably support many customers and is easy to scale with additional computing resources. In general, information about events to be monitored or managed flows from information source(s) (hereafter "agents") to a CTA 120 and then to a CTS 140, from which the information is then passed to appropriate network management tools.

In some embodiments, applications will include those developed in Java. Java provides cross platform support and access to many libraries that already support various protocols used by event delivery system 100. This approach also provides a high degree of software re-use and the possibility of creating new products such as monitoring solutions requiring zero in cage hardware footprint.

CTA 120 and CTS 140 may use extended markup language (XML) to share data and configuration information between various components. XML has many advantages over other formats including its ability to be extended without reengineering applications. The event delivery system 100 may define an XML schema to describe event information. This schema allows any application that supports HTTP and XML to deliver events into particular systems (e.g., into SevenSpace systems in some embodiments).

As shown in FIG. 1, the event delivery system 100 includes the CTA 120 that receives reactive, proactive and/or predictive event information from at least one of managed device agents 102, 104, and 106. The CTA 120 preferably includes several lightweight software components. While these components are preferably targeted to be executed on the CTA platform, they could easily be executed on customer or partner hosts or the like to provide zero or substantially zero hardware footprint monitoring in cases where the customer only requires monitoring, or monitoring and reporting, on servers.

Devices produce reactive event information, for example, when they encounter an error or reporting condition. Reactive events are typically delivered in Simple Network Management Protocol (SNMP), System Log (Syslog) or other suitable formats. SNMP/Syslog formats may be considered unreliable due to their delivery being over the User Datagram Protocol/Internet Protocol (UDP/IP) protocol. Proactive events, for example, can be produced by an external entity (such as a CTA) polling the device to check its health. Predictive events, for example, can be produced by an external entity (again, such as a CTA) polling the device to collect performance metrics of the target device. Reactive, proactive and predictive events are collected by the client application using appropriate native protocols, such as SNMP trap, SNMP, Syslog, Remote Monitoring (RMON), Internet Control Message Protocol (ICMP) Ping and/or the like.

The CTA 120 includes reactive event receptors 124, which collect asynchronous events from monitored devices. Preferably, specific receptors may be developed to support the core monitoring technologies deployed. These may include a SNMP receptor 126 and an Syslog receptor 128. Using this model, the CTA 120 can be easily extended to support other future monitoring technologies, accommodated in a receptor 124. Events reported from agents 102, 104 and/or 106 are delivered over User Datagram Protocol (UDP) transport. UDP does not make provision for the sender to attempt retransmission should the receptor be blocked and is not able to process the inbound event. To minimize the risk of losing events, each receptor's function will be limited to receiving the event and queuing in the native format for additional processing.

The function of a predictive collector 122 is to perform SNMP polling operations to collect the appropriate values that are queued for delivery. Preferably, a CTS deferred reporting engine 154 breaks these requests back into the appropriate format for queuing in a data warehouse, which is included within enterprise network management system 160. In preferred embodiments, performing in this manner allows CT to preserve a near real time reporting capability.

A proactive polling module 132 provides a heartbeat module that delivers predictive monitoring. A heartbeat helps identify a properly functioning system from a disabled system. For example, if the receptors are not receiving events from a customer device, one of the following scenarios is true: the device is healthy and is not attempting to send events; or the device is hard down and not capable of generating events. Proactive polling element 132 provides an extra level of confidence that customer hosts are alive by performing SNMP "pings" of agents ensuring that, e.g., both the TCP/IP stack and agents are alive. The heartbeat will send the results of the "ping" to CTS 140 via an event delivery process. This information can be used to present up/down information on monitored systems and also validated by a CTS proactive monitor 150 to ensure the CTA 120 has checked in within an appropriate window and all monitored servers are well.

With the successful reception of event data from the managed devices by the CTA 120, an extensible mark-up language (XML) encapsulation, encryption and delivery module 134 begins a delivery phase to transport the data to a set of data monitoring and management tools. Each type of event received is encapsulated, for example, in the form of an XML message using predefined XML schemas. The XML message is encrypted, preferably using a common encryption protocol, for example, Twofish, Blowfish, Data Encryption Standard (DES), Advanced Encryption Standard (AES), or the like. Encrypted XML messages are delivered via Hyper Text Transfer Protocol (HTTP) protocol between CTA 120 and CTS 140. Should the connection between the CTA 120 and CTS 140 be unavailable, or the connection quality be deemed unsuitable for transport, the CTA 120 may look for alternative CTS servers located in diverse locations. If these are not available, the CTA 120 may act in a store and forward mode until such time that the connection is of sufficient quality to deliver event information.

An HTTP transport module 136 is responsible for the actual delivery of events from CTA 120 to CTS 140. It operates on the push paradigm and only requires an outbound channel from the customer's network to CTS 140 to operate. Events are encapsulated in either HTTP or HTTPS protocol for delivery. Confidentiality of the event traffic leaving the CTA 120 may be maintained by having the XML message encrypted before transmission. Thus, the system can achieve benefits of HTTPS without the overheads associated with that protocol. Using this mode of operation, the CTA 120 can sustain, in some embodiments, hundreds of events per second. Additionally, the HTTP protocol is also customer friendly in that most customers already permit outbound HTTP connections through their firewalls.

Data from the CTA 120 is passed via an Internet transport 138 to the CTS 140. (The data path between the CTA 120 and the CTS 140 is further depicted in FIG. 6.) Referring still to FIG. 1, while the CTS 140 may be designed to support the CTA 120 information, its open nature facilitates simple integration with future monitoring technologies. These include, for example, new agents and data collection products. The CTS 140 may also be deployed in multiple locations to provide geographic failover or event routing or the like.

An HTTP transport module 142 in the CTS 140 performs the actual receiving of events from the CTA 120 to the CTS 140. Data is passed from HTTP transport module 142 to an XML reception, decryption, and decomposition module 144 for further processing with the CTS 140.

The XML reception, decryption, and decomposition module 144 provides a reception and decomposition layer to ensure the successful delivery and acknowledgement of information from the CTA 120. Prior to an acknowledgement being issued, the information is checked for errors in data transmission using an md5 checksum or other method of checksum. Should the event fail its consistency check, the CTS 140 will preferably issue a failure status causing the event to be re-queued by the CTA 120 for retry delivery. As the CTS 140 receives each message, an acknowledgement is provided to the client instructing it that the message was both received and undamaged in transport. At this point, the client is permitted to remove the message from its outbound queue.

An event conversion, augmentation, enrichment module 146 may include some or all of the following features. Preferably, events are received by the server (CTS) application delivered over the HTTP protocol. The integrity and confidentially of these events are validated by the CTS application in module 146. Confirmation of successful reception is provided to the CTA application. CTS application decrypts event message to its XML message format. The XML message is augmented and enriched with additional contextual information. Preferably, conversion of any values such as IP addresses or host name references is performed by an XSL translation.

The proactive monitor 150 provides both a remote health check of all CTA/monitored devices and the simple up/down state of the device (e.g., shown by, for example, Spyglass or other proprietary applications that allow a client to view information stored in the CTA). In this regard, the heartbeat monitor preferably interfaces both with a client viewing application (e.g., Spyglass) and an object server. An object server provides a database that holds information to be presented to operators of the enterprise monitoring system tools so that new events can be identified and acted upon as they arrive. Preferably, should the heartbeat monitor detect a CTA that has not checked in within a pre-determined time or a customer's device that also has not checked in, an event can be generated to create an alert (e.g., to alert an operations center of the outage).

The enriched XML message is converted to its original native format (typically, SNMP trap, Syslog or another format) before being presented to tools supporting these native protocols (e.g., enterprise monitoring system) for presentation to analysts for evaluation. A predictive reporting module 148 inserts reporting data captured by the CTA 120 into a system (e.g., SevenSpace Inc.) data warehouse where it is available for reporting and trending.

When the originating device delivers events via SNMP to the CTA 120, it is necessary to enrich these events before presenting to the operations center. In this mode of operation, an SNMP event generator 154 reconstitutes the SNMP as an SNMP trap which looks identical to the event arriving at CTA 120 with any changes made during transformation. The event generator 154 preferably sends to a local probe within enterprise network management system 160 that contains rules to set severity and augment with any local inventory information. Preferably, address translation is performed at this point to cover customers who may have overlapping address spaces.

Per a similar model as the SNMP event generator 154, raw Syslog information is often too generic to be presented to a GMOC engineer for evaluation. In a Syslog event generator 156, the event may be reconstituted as a Syslog message and delivered to the local Syslog probe for evaluation against the Syslog rule set. Preferably, address translation is performed at this point to cover customers who may have overlapping address spaces. A similar process is also used for an other events generator 152.

Using the CTA 120 and CTS 140, event data is successfully and securely transferred from the managed devices to the enterprise network management system 160. The enterprise network management system 160 comprises a variety of data management tools known in the art to monitor, manage and report event data.

In preferred embodiments, the CTA 120 includes a rack mountable server with minimal CPU, memory and/or disk requirements and that allows a variety of vendors to be considered. In some embodiments, the operating system can be, e.g., a custom Linux Release to Manufacturing (RTM) distribution built to support specific CTA functions with all redundant applications stripped away. This distribution can be, e.g., heavily fortified with security features such as, e.g., Linux IPCHAINS stateful inspection firewall, Secure Shell (SSH), Tripwire and/or appropriate file system permissions to lock down the functions further. In addition, a journaling file system is preferably selected which may improve both performance and reliability of the platform.

CTS 140 provides a highly scalable platform to support event delivery and/or preferred polling support. A variety of server platforms may be used for CTS 140. In some embodiments, e.g., Sun Solaris based servers can be used to support the CTS 140 platform. These servers can run, e.g., Apache.RTM. web server with java servlet support.

Figure 2:
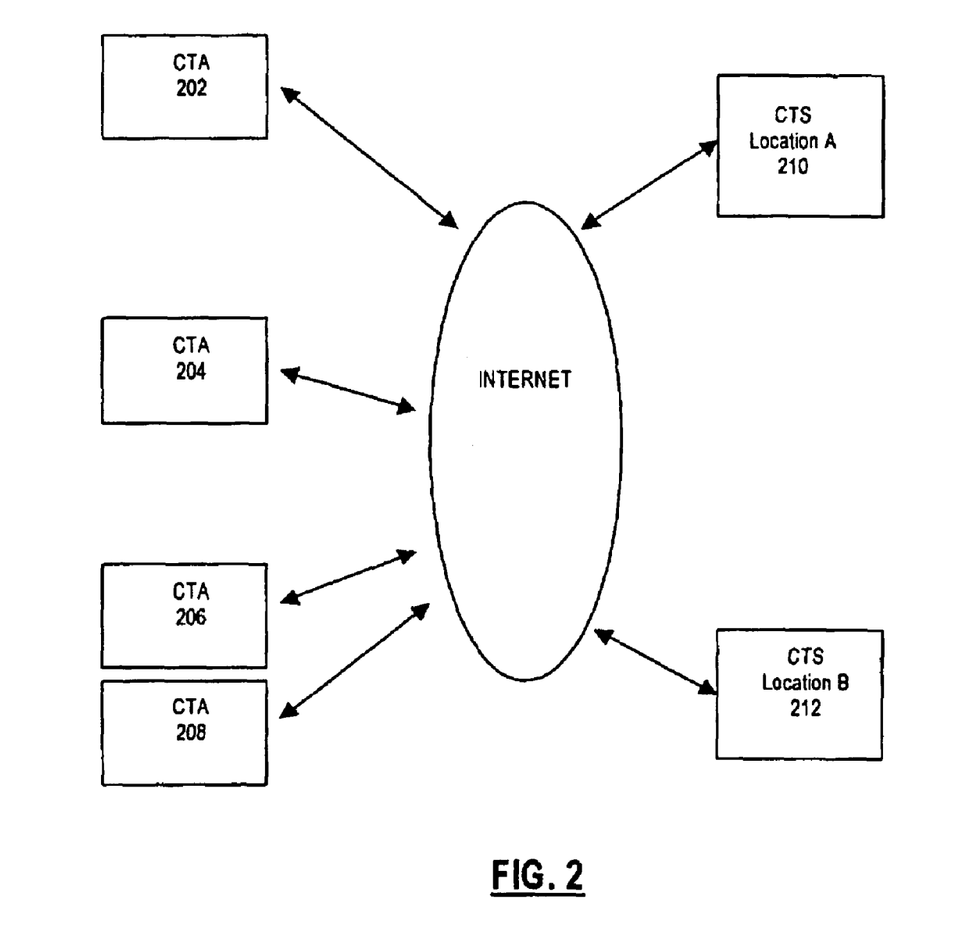
FIG. 2 is depicts a shared redundant platform in accordance with some illustrative embodiments.

FIG. 2 provides an illustration of how the present invention can be configured with a shared redundant platform. Data from managed devices collected at CTA's 202, 204, 206, and 208 is passed via the Internet to one of two CTS locations 210 and 212. In this configuration, the CTS is deployed in multiple locations to provide geographic failover or event routing. For example, the system may be configured with a default that sends data from CTA 202 to CTS location 210. If the connection to CTS location 210 is interrupted or if CTS location 210 is otherwise inoperable, data from CTA 202 can alternatively be sent to CTS location 212. As another example, the system may be configured with defaults so that a particular type of data (e.g., proactive polling data) is sent to CTS location 210, while another data type (e.g., reactive SNMP data) is sent to CTS location 212. However, all data could be sent to one CTS, in the event of a failure at one of either CTS location 210 or 212.

Figure 3:
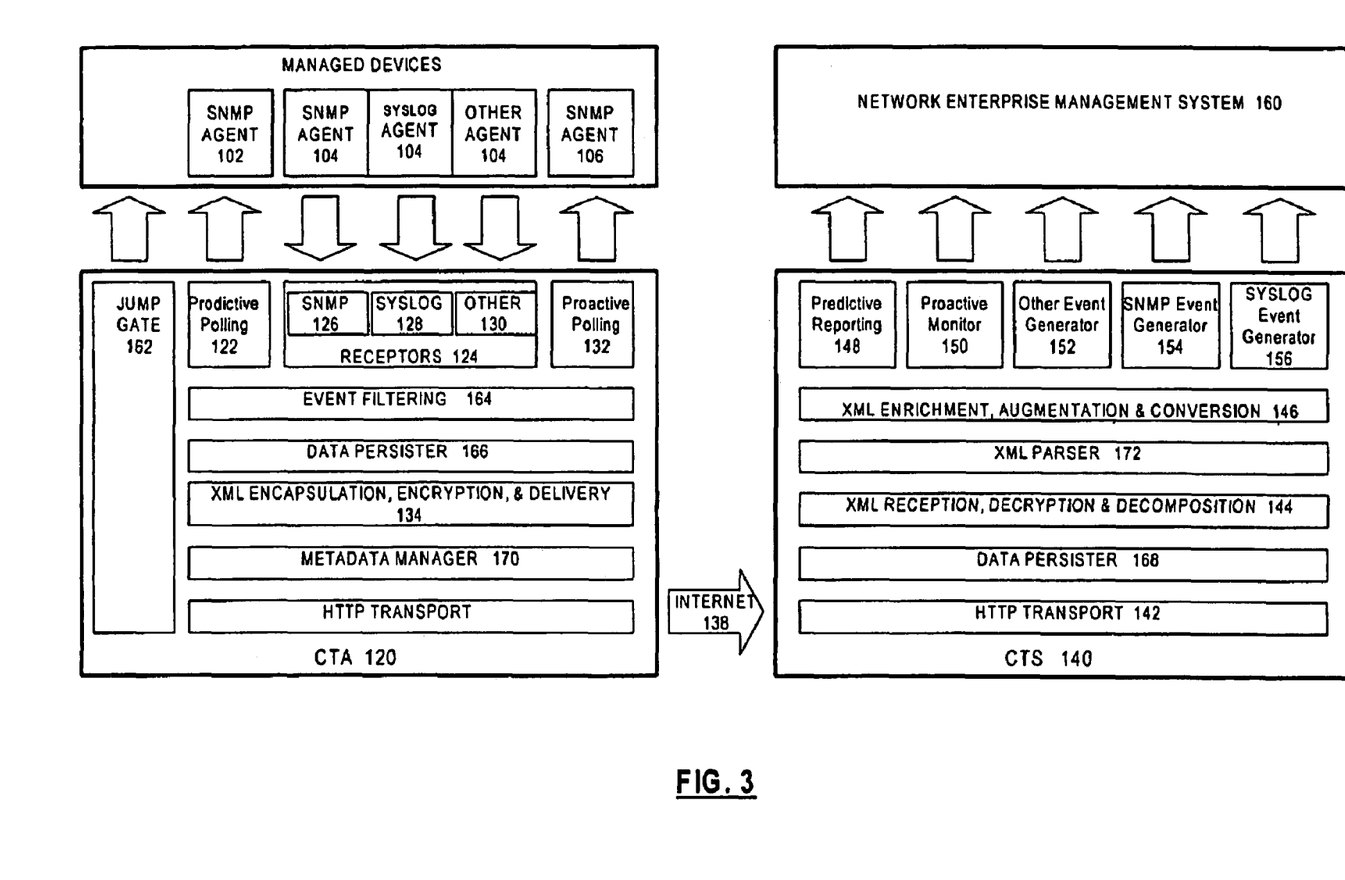
FIG. 3 is illustrates the information flow and key components in an embodiment of the present invention using a customer jump gate.

FIG. 3 illustrates the information flow and components of an event delivery system using a customer jump gate and other additional modules. Refer to jump gate module 162. A management company may require full management access to customer devices to perform fault remediation and root cause analysis. Management access can provide a number of challenges from both IP connectivity and security fronts. Use of CTA 120 can solve these issues by, e.g., using soft VPN's between metaframe management hosts distributed across the management company's infrastructure directly to the CTA 120. Once connected and authentication has taken place, CTA 120 may provide a jump point to manage customer devices. This approach can, e.g., resolve the need for network address translation to be performed since CTA 120 can, e.g., both have a public Internet address and be connected to, e.g., the customer's locally allocated address space defined by, for example, RFC1918.

In preferred embodiments, CTA 120 supports at least some, preferably all, of the following management protocols: 1 Protocol Use Telnet Basic network equipment (such as, e.g., Cisco) SSH Unix based hosts and encryption aware network devices X Unix hosts requiring X-windows management tools Virtual Network Computing (VNC) Support for VNC including tightlib compression and encryption and Windows and Unix platforms Window Terminal Services (RDP) Windows 2000 HTTP/S Launching web browsers to locally adminstrate applications (such as, e.g., Netscape admin server) PCAnywhere Support for Windows servers running PCAnywhere protocols Jump gate 162 can be used to unify these access methods to a single host to simplify remote support.

Refer now to event filtering module 164 of FIG. 3. Most devices capable of generating events make no provision to selectively chose events to send other than basic severity level settings. Event filter 164 provides a mechanism to squelch types of events or hosts from delivering information to the CTS 140. In some embodiments, filtered events are defined using XML showing the event schema field to search for and the string to match within the field. These strings may be expressed, e.g., as regular expressions to provide multiple matching (wildcards).

A data persistence layer 166 permits CTA 120 to operate in store-and-forward mode should the Internet connection to the CTS become unavailable. In this mode, the CTA 120 queues events for future delivery to ensure no events are lost in transit. In some embodiments, persister 166 only permits events from being "dequeued" on confirmation of event reception from the CTS 140. Thus, the system may be used to provide reliable delivery of events over potentially unreliable transport (such as, e.g., over the Internet). Each event is acknowledged by the CTS 140 on reception and only at this time are events "dequeued" by the persister. Corresponding to data persister 166, data persister 168 in the CTS 140 performs the same function for information transmissions from the CTS 140 back to the CTA 120.

CTA requires several items of metadata to describe a customer environment and support core operations. This may include, e.g., inventory information, address translation, polling intervals and/or values to be collected by the data collector. Collection and processing of this data is accomplished through metadata manager 170. Preferably, all metadata within the CT is stored in XML format. Among other things, this may provide a high degree of portability and/or easy interaction with CT components. In preferred embodiments, metadata is hosted on the CTS and transferred to the CTA on startup and configuration changes. Among other things, this mode of operation may allow for rapid swap outs of hardware should a failure occur.

In some illustrative embodiments, substantially any management company's support personnel with knowledge of the customer's systems will be able to provision the CTA 120. Preferably, the CTA 120 accomplishes such flexibility by the custom Linux.RTM. distribution being preloaded onto each CTA in base configuration. On first boot of the server, a series of questions will preferably drive the addressing, configuration and/or startup of CTA 120. Once deployed to a customer, CTA 120 will immediately make contact with the management company pushing its configuration back for archival. Should the CTA 120 suffer hardware failure, a process will preferably be provided to activate this backed up configuration on a clean box before reshipping. This automated approach minimizes deployment and support activities and leverages customer engineers who have detailed knowledge of a particular deployment.

Finally, FIG. 3 also depicts an XML parsing module 172 in CTS 140. XML parser 172 intercepts inbound messages from CTA and selects the appropriate interpreter to handle the data. This may be accomplished, e.g., by interpreting the XML data type field to select the correct handler to process the event.

Figure 4:
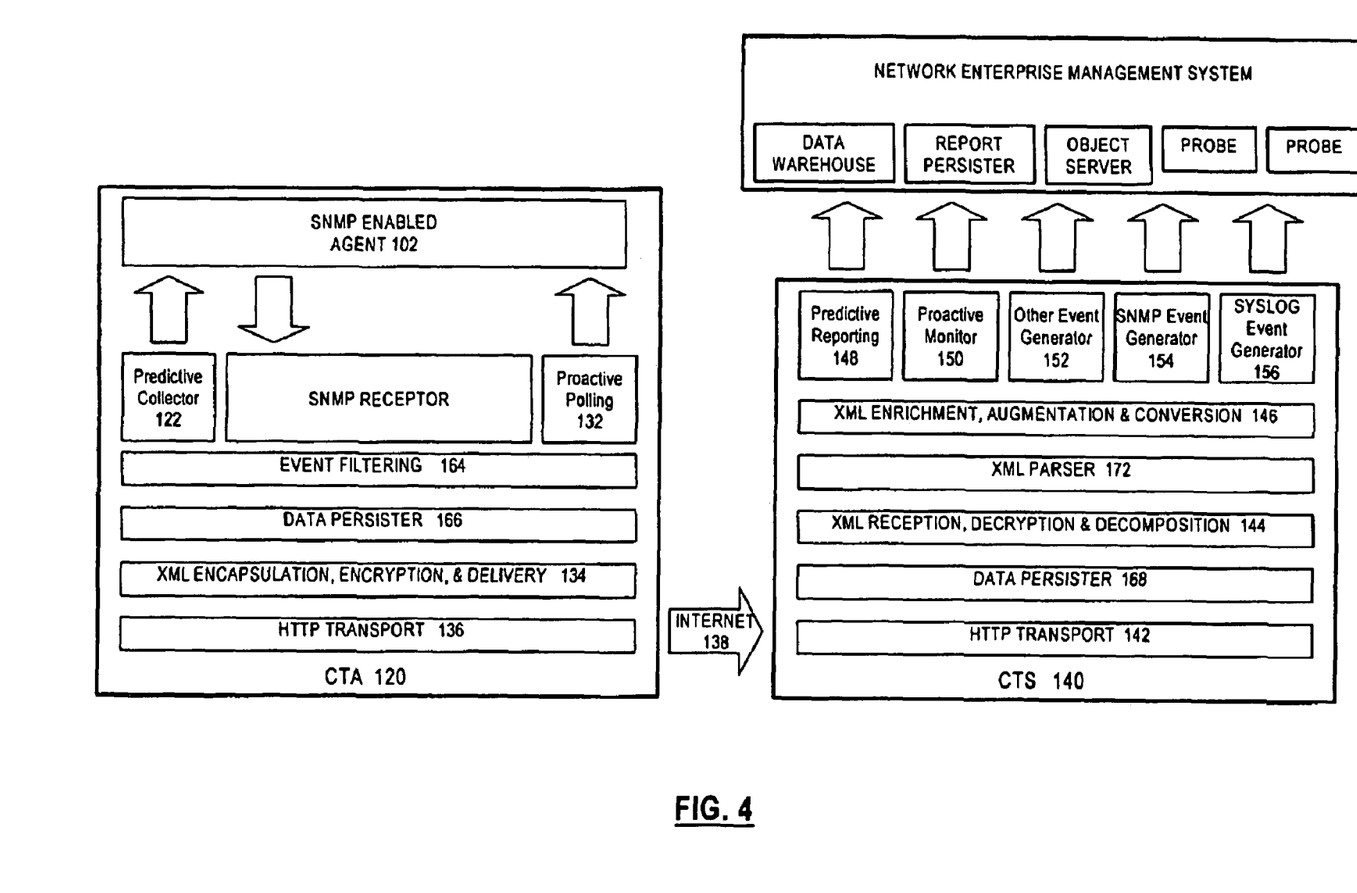
FIG. 4 illustrates the information flow and key components in an embodiment of the present invention using a software-only deployment.

FIG. 4 depicts an embodiment of the present invention using a substantially software deployment. In many cases, it is desirable to deploy the monitoring/reporting features of CT without or substantially without the additional cost of deploying a hardware solution. Particularly, for example, if a monitoring and/or management company is performing service on a limited number of hosts, a third party is providing the hands on remediation or is trailing such services.

In some embodiments, re-using the lightweight components of the CTA architecture, it is possible to deploy a minimal interface to allow the monitoring application agent (such a SysEdge.TM. agent) to fully interoperate with a CTS over the Internet using only push technology. This requires no inbound access to the customer network. Using this mode of operation allows a monitoring and/or management company to leverage its investment in the monitoring application and the effort in building out application specific configuration files to customers who do not warrant the deployment of a server solution.

In this model, the monitoring application may be configured to send event SNMP traps to its loop back address (back to itself without traversing down to the physical layer) where the receptor would process the event and deliver to the CTS. Moreover, the data collector and heartbeat modules may be deployed to provide proactive reporting and proactive monitoring services. In preferred embodiments, the overhead should be minimal and should comfortably run on many web, database and/or application server(s).

Figure 5:
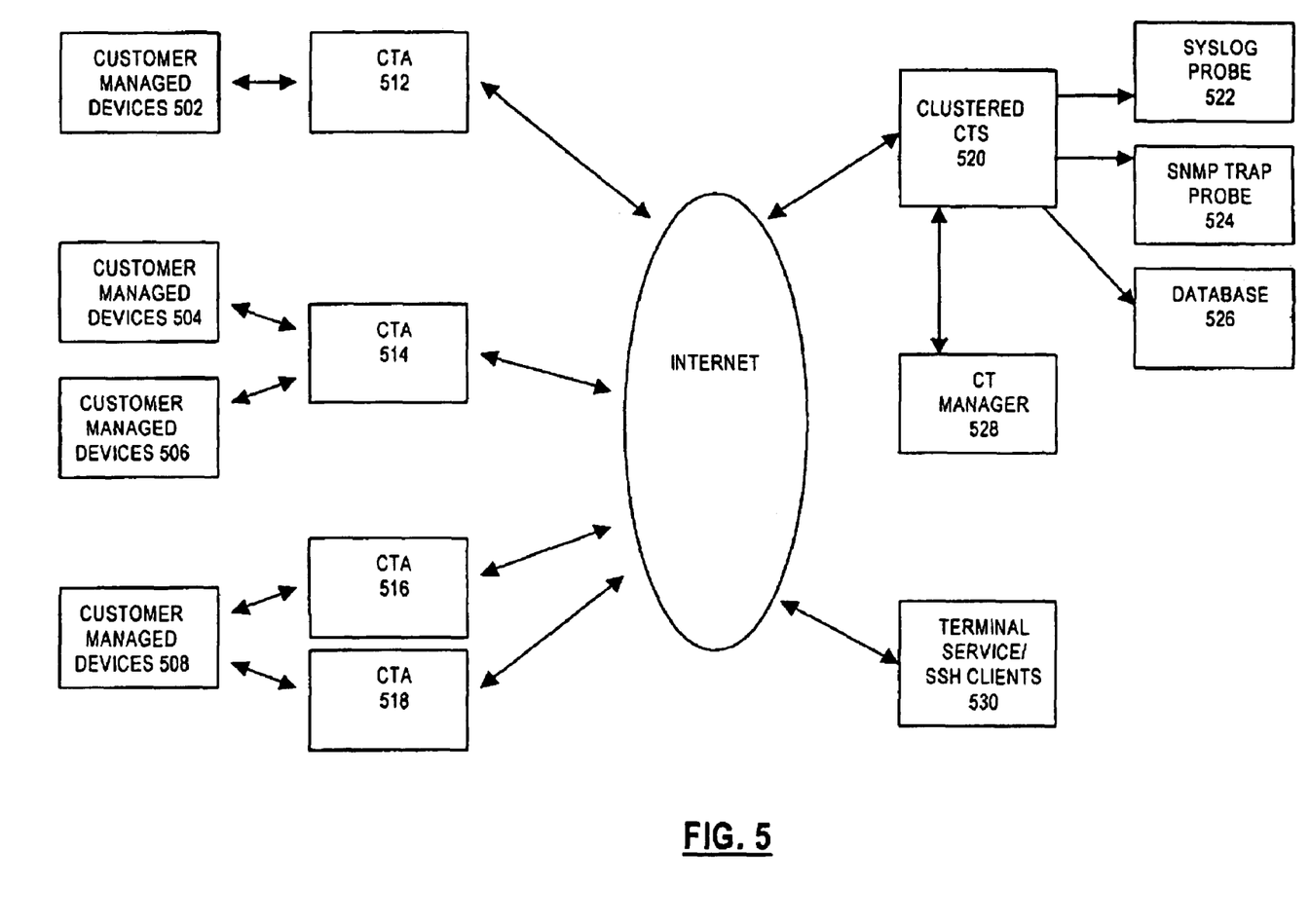
FIG. 5 provides an illustrative system view of the present invention.

FIG. 5 provides an illustrative system view of the control tower applied in a multiple client environment. Generally, CTA's may be deployed in one-to-one, one-to-many, or many-to-one configurations depending on customers/partners environment. In FIG. 5, Customer Managed Device (CMD) 502 is connected in a one-to-one relationship with CTA 512. CMD 504 and CMD 506 are connected with CTA 514 in an exemplary one-to-many relationship, so that both customers are able to report events from managed devices to single a CTA. A one-to-many relationship may be useful, for example, for customers with combined number of managed devices below the connection capacity of the CTA hardware to provide hardware cost savings. CMD 508 is connected with CTA in an exemplary many-to-one relationship, so that a single customer provides reporting data to more than one CTA. A many-to-one relationship may be useful, for example, for a customer who has a total number of devices that exceeds the connection capacity of a single CTA.

Still referring to FIG. 5, data transmitted to and from CTA's 512, 514, 516, and 518 may be securely transported via the Internet to a cluster of CTS's 520, including one or more CTS's. A single CTS will preferably support many customers and is easy to scale with additional computing resources. Data from each CMD 502, 504, 506, and 508 may be directed to an appropriate a local probe within a set of enterprise network management tools, such as Syslog probe 522 or SNMP trap probe 524. Customer data may also be routed to a local database connected to CTS cluster 520. Additionally, operations of CTS cluster 520 may be managed by a separate control tower manager 528 that is operatively connected to CTS cluster 520. Rather than to a CTS, data from CTAs 512, 514, 516, and 518 may also be securely transported via the Internet to a thin client architecture 530, such as Terminal Services or SSH clients.

Figure 6:
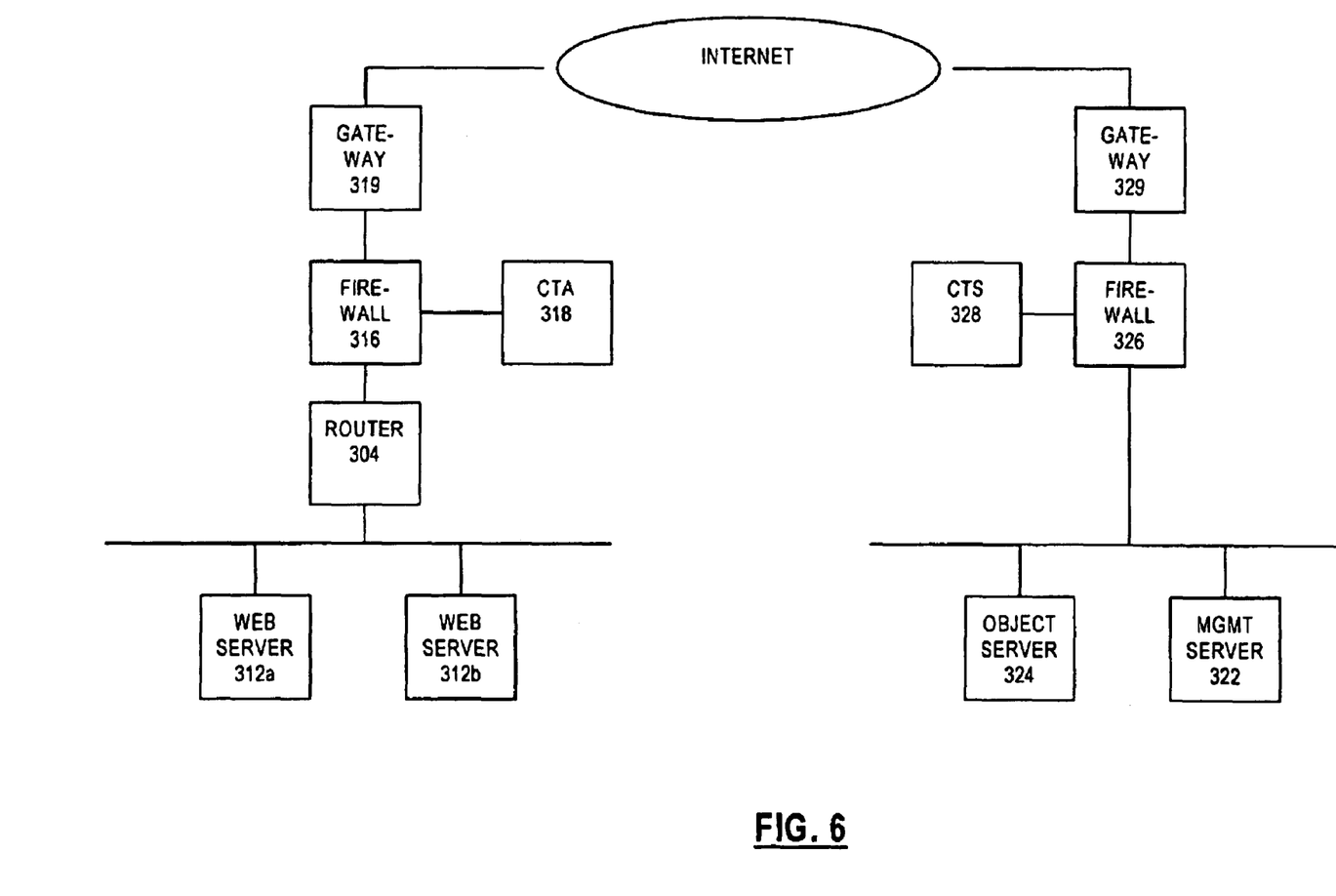
FIG. 6 provides an illustrative configuration of the present invention for a single customer.

FIG. 6 is an illustrative configuration for a single customer using one embodiment consistent with the present invention. Event data from customer web servers 312a and 312b and from router 304 are passed to the customer's CTA 318. Reactive events are typically delivered to CTA 318 in SNMP or Syslog formats. Predictive collection and proactive polling may be delivered from the CTA to a client device via SNMP or ICMP formats. From CTA 318 data is passed over the Internet via a standard outbound HTTP connection through firewall 316 and gateway 319 using XML over HTTP. The data is received at CTS 328 located in a data management center network through gateway 329 and firewall 326. The data is received and reformatted in CTS 328 and provided via TCP database inserts to an object server 324. The data is monitored and analyzed within data management center. Information from data management center is provided for access by the client by sending data from Citrix® management server 322 back to CTA 318 via a virtual private network (VPN). Numerous other configurations using combinations of the above protocols, as well as those using different protocols are envisioned within the scope of the present invention.

Figure 7:
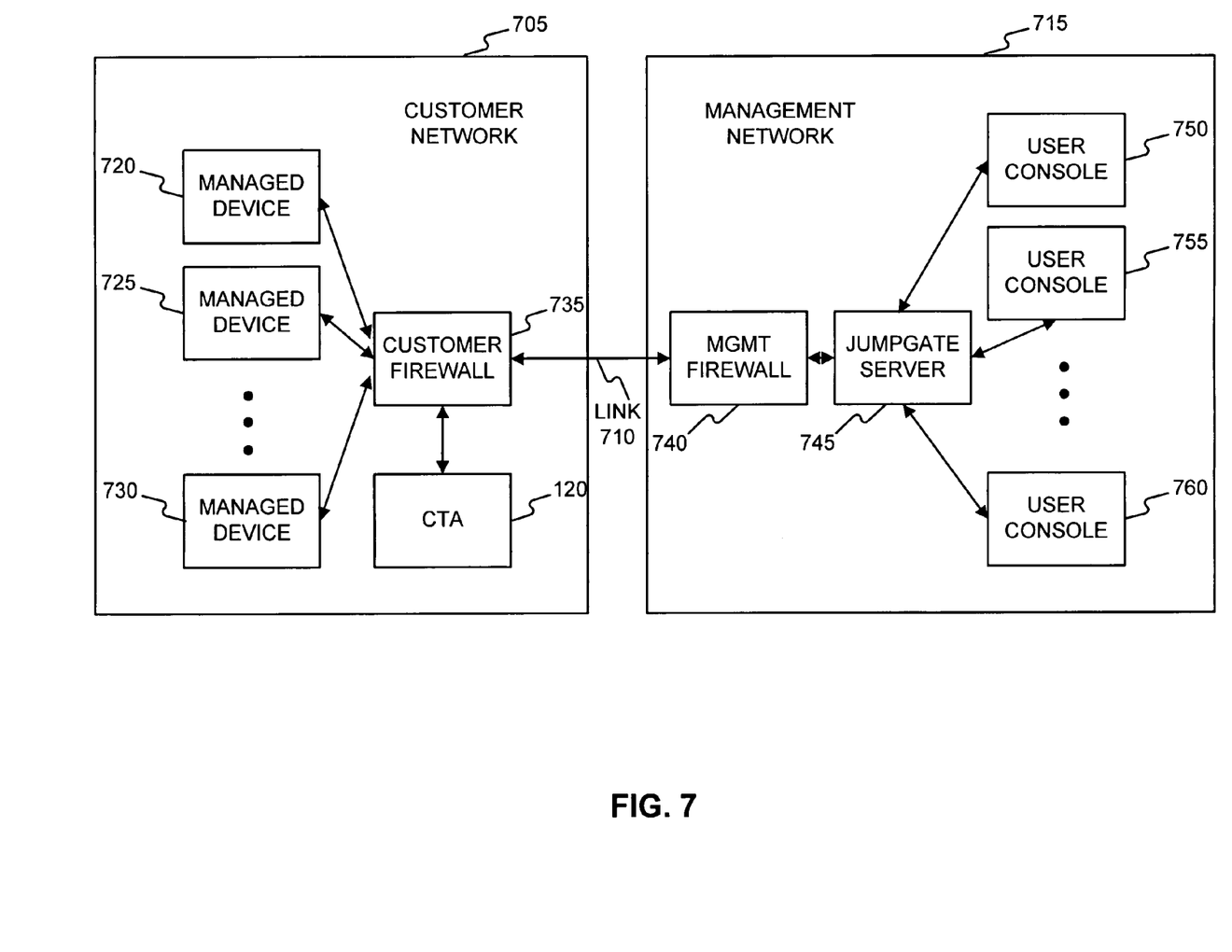
FIG. 7 is a schematic diagram of a functional architecture for a network management system, according to an embodiment of the invention.

FIG. 7 is a schematic diagram of a network management system, according to an embodiment of the invention. As shown in FIG. 7, a customer network 705 is coupled to a management network 715. In the illustrated embodiment, the customer network 705 includes a customer firewall 735 that is coupled to CTA 120 and managed devices 720, 725, and 730. The management network includes a jumpgate server 745, user consoles 750, 755, and 760 coupled to the jumpgate server 745 and a management firewall 740, also coupled to the jumpgate server 745.

The jumpgate server 745 may be, for instance, a Solaris 9 server from Sun Microsystems, Inc., and may also be referred to herein as a management server. Although jumpgate is a proprietary name associated with Sun Microsystems, Inc., as used herein, jumpgate refers more generally to gateway-like features.

The customer firewall 735 is coupled to the management firewall 740 via link 710. The customer firewall 735 and the management firewall 740 provide network security in the conventional fashion. Link 710 may be or include the Internet or other network configured to handle communication between networks 705 and 715. In the illustrated embodiment, the CTA 120 exists in a Demilitarized Zone (DMZ) outside of the customer firewall 735, operating in compliance with a security policy of the customer network 705. A DMZ is computer or small network that is functionally positioned between a trusted internal network and an un-trusted external network. A firewall is a system that is designed to prevent unauthorized access to or from a secure network.

Variations to the embodiment shown in FIG. 7 are possible. For example, the CTA 120 may be replaced by multiple CTA's in customer network 705. Likewise, the jumpgate server 745 may be replaced, for example, with a load-balanced farm of Solaris 9 servers in the management network 715. Moreover, a single management network 715 may service multiple customer networks 705.

Figure 8:
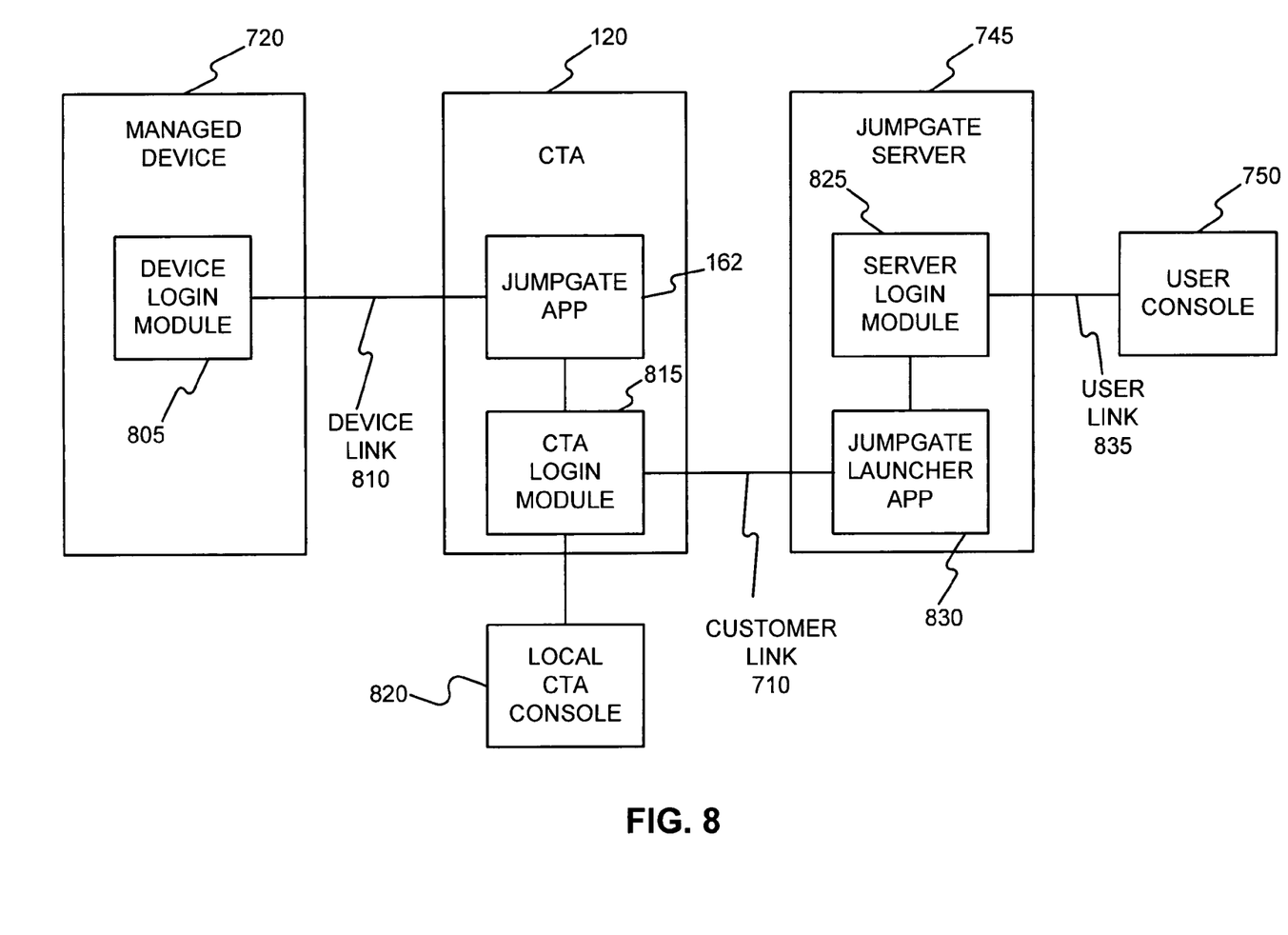
FIG. 8 is a schematic diagram of a functional architecture for a network management system, according to an embodiment of the invention.

FIG. 8 is a schematic diagram of a functional architecture for a network management system, according to an embodiment of the invention. FIG. 8 highlights security features of a portion of the architecture shown in FIG. 7, and emphasizes the functional coupling between the CTA 120 and the jumpgate server 745.

As illustrated in FIG. 8, a CTA 120 is coupled to a managed device 720 and a jumpgate server 745. Managed device 720 includes a device login module 805. Further, the CTA 120 includes a jumpgate application 162 coupled to a CTA login module 815. A local CTA console 820 is also coupled to the CTA login module 815, although the login module 815 may be configured so that access to the CTA 120 from the local CTA console is limited to root login. The jumpgate server 745 includes a server login module 825 coupled to a jumpgate launcher application 830. The jumpgate launcher application 830 is code used to establish a link between the jumpgate server 745 and the CTA 120. Jumpgate server 745, the CTA 120, and the managed device 720 each include local security modules.

A user console 750 external to the jumpgate server 745 is coupled to the server login module 825. The user console 750 may include a client Web browser, for instance a Citrix Web browser or other viewer to communicate with the jumpgate server 745.

As shown, the device login module 805 is coupled to the Jumpgate Application 162 via device link 810, the CTA login module 815 is coupled to the jumpgate launcher application 830 via customer link 710, and the server login module 825 is coupled to the user console 750 via user link 835. The device link 810 may be an Ethernet or other protocol, and typically functions as a Local Area Network (LAN). Customer link 710 and user link 835 may each utilize the Internet in a Wide Area Network (WAN) configuration. Data on links 810, 710, and/or 835 may be encrypted. For example, the user link 835 may utilize 168 bit Secure Socket Layer (SSL) encryption. But there is no requirement that each of the links 840, 710, and 835 provide the same type or level of encryption.

In operation, a user at user console 750 seeking access to the managed device 720 logs into the jumpgate server 745 via server login module 825 via user link 835. Upon authentication in the server login module 825, the user request is promoted to the jumpgate launcher application 830. The jumpgate launcher application 830 then couples to the CTA login module 815 via the customer link 710. Preferably, the CTA login module 815 is configured to deny remote access from other than a jumpgate server 745 having a jumpgate launcher application 830. Upon authorization by CTA login module 815, a connection request from the user at user console 750 is promoted to the jumpgate application 162. The jumpgate application 162 accesses device login module 805 via device link 810, and access to the managed device 720 is provided according to conventional password mechanisms.

Figure 9:
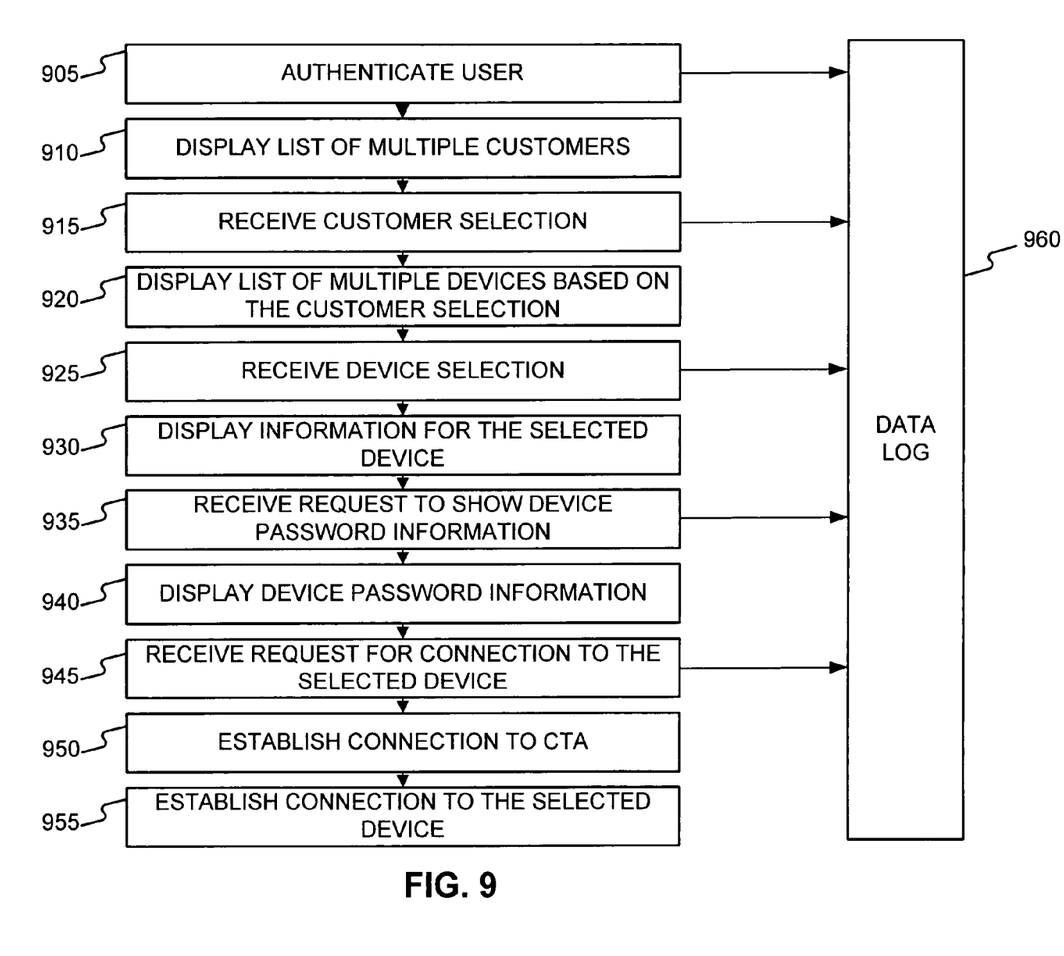
FIG. 9 is a flow diagram of a network connection process, according to an embodiment of the invention.

FIG. 9 is a flow diagram of a network connection process, according to an embodiment of the invention. As shown in FIG. 9, the process begins by authenticating a user at the user console 750 in step 905. Where the user console 750 includes a Citrix Web browser, the server login module 825 may be configured to only accept login requests from a Citrix client. Authentication step 905 may include two parts: a first login to establish a HTTP connection, and a second login to the jumpgate launcher application 830. Preferably, user privileges associated with jumpgate launcher application 830 may be constrained by predetermined authorizations associated with the user being authenticated in step 905. In embodiments of the invention, the user console 750 can only obtain access to the server login module 825, jumpgate launcher application 830, and no other applications within the jumpgate server 745.

Next, the process displays a list of multiple customers to the user in step 910. The execution of step 910 is an example where execution may be limited by predetermined user privileges—all users may not have access to all customer networks. Upon receipt of a customer selection from the list of multiple customers in step 915, the process displays a list of multiple devices in step 920. Then, upon receipt of a device selection from the list of multiple devices in step 925, the process displays information for the selected device in step 930. The information displayed in step 930 may include, for example, the make and model of the device, the device IP address, an identifier for the CTA associated with the device, and an IP address for the associated CTA.

In step 935, the process receives a request to show device password information; in response, the process displays device password information in step 940. The device username and password information is that required by device login module 805. In executing step 940, the process may obtain such information from a password vault application (not shown). The link to the password vault application, and the credentials (username and password) themselves, are preferably encrypted. Moreover, access to such credentials may be limited according to predetermined user privileges.

In step 945, the process receives a request for connection to the selected device; in response, the process establishes a connection to the CTA 120 in step 950, and a connection to the selected device in step 955. The session between the jumpgate server 745 and the CTA 120 may utilize Secure Shell (SSH/SSH2) protocol.

From the perspective of a user at the user console 750, step 945 provides one-click connection to the selected managed device. But the user console 750 does not actually have a direct connection to the managed device 720. Instead, the user console 750 establishes a limited connection to the CTA 120 via the jumpgate server 745 (as will be described further below), and the CTA 120 has a direct connection to the managed device 720.

Preferably, one or more steps associated with user access and/or the launch of software applications are logged for future audit and accountability control. For example, textual data associated with each of steps 905, 915, 925, 935, and 945 may be logged in data log step 960, and such data may be retained according to a predefined data retention policy. Review of, and access to, the logged data may be restricted.

Not all steps illustrated in FIG. 9 are required. For example, a user at user console 750 may not require device password information. In this instance, steps 935 and 940 may be omitted.

Figure 10:
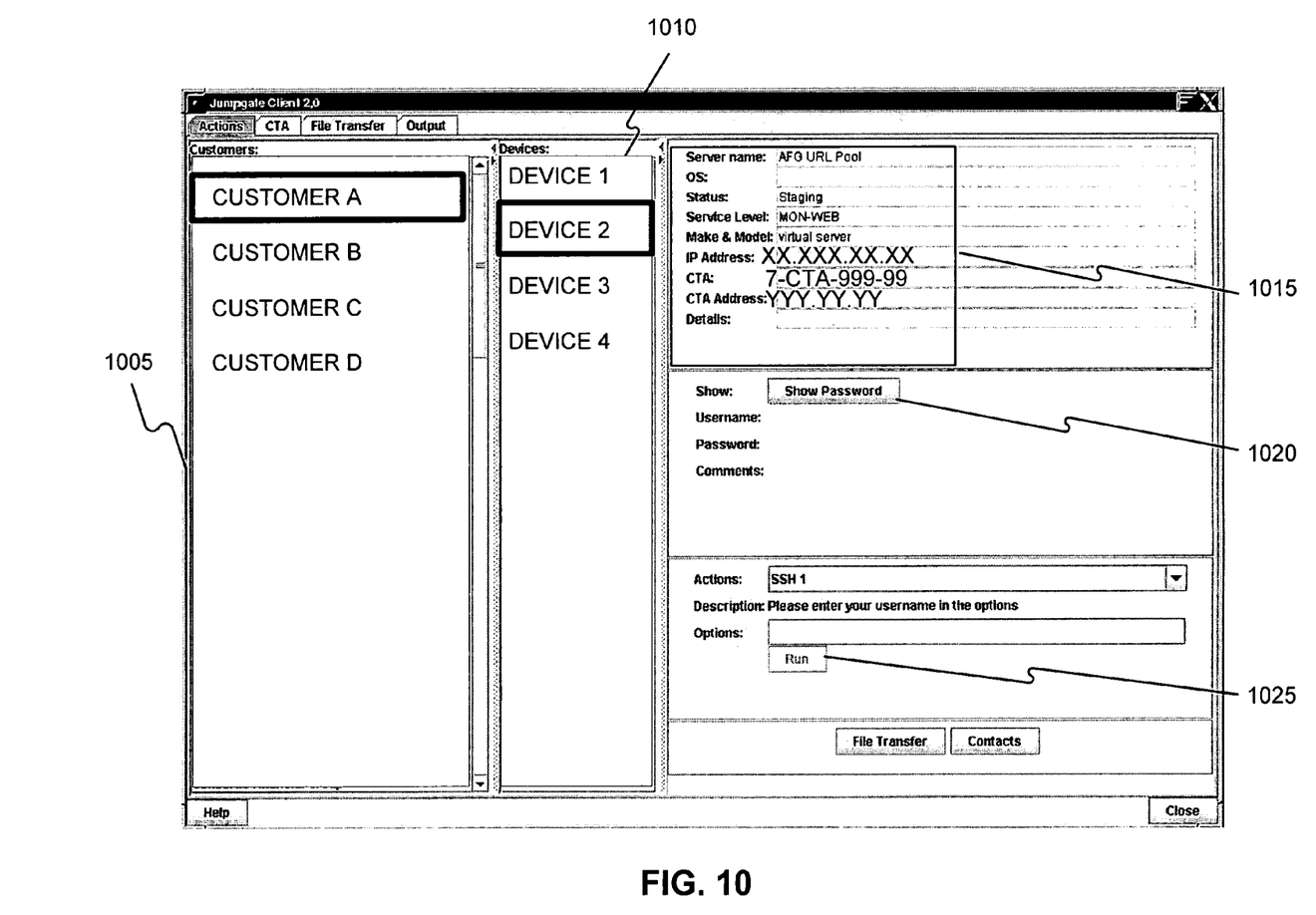
FIG. 10 is an illustration of a graphical user interface, according to an embodiment of the invention.

FIG. 10 is an illustration of a graphical user interface according to an embodiment of the invention. The Graphical User Interface (GUI) shown in FIG. 10 may be displayed on the user console 750 during execution of the process described above with reference to FIG. 9.

As shown in FIG. 10, the GUI may include a customer list window 1005. The customer list window 1005 facilitates displaying step 910 and selection step 915. As illustrated, four customers are listed in the customer list window 1005, and a user has selected CUSTOMER A. The illustrated GUI also includes a device list window 1010. The device list window 1010 facilitates displaying step 920 and selection step 925. As illustrated, four devices (DEVICE 1, DEVICE 2, DEVICE 3, and DEVICE 4) are associated with CUSTOMER A, and a user has selected DEVICE 2 in the device list window 1010. The GUI illustrated in FIG. 10 includes a device information window 1015 to facilitate display step 930. As illustrated, device information window 1015 includes information associated with DEVICE 2. The information displayed in information window 1015 may include, for example, the make and model of the device, the device IP address, an identifier for the CTA associated with the device, and an IP address for the associated CTA.

The illustrated GUI also includes password button 1020 associated with step 935, and run button 1025 associated with step 945. The password button 1020 is used to request password information, such as a username and password, associated with the selected managed device. The run button is used to request a connection to the selected managed device.

The foregoing descriptions with reference to FIGS. 8, 9, and 10 described (among other things) a system, method, and GUI, respectively, for establishing a communication session from the user console 750 to a managed device 720. Once such a session is established, low-bandwidth communications are utilized on link 710. More specifically, session communications from the jumpgate server 745 to the CTA 120 are preferably limited to keyboard, mouse, or similar Input/Output (I/O) command signals, and communications from the CTA 120 to the jumpgate server 745 are preferably compressed computer video screen information.

Figure 11:
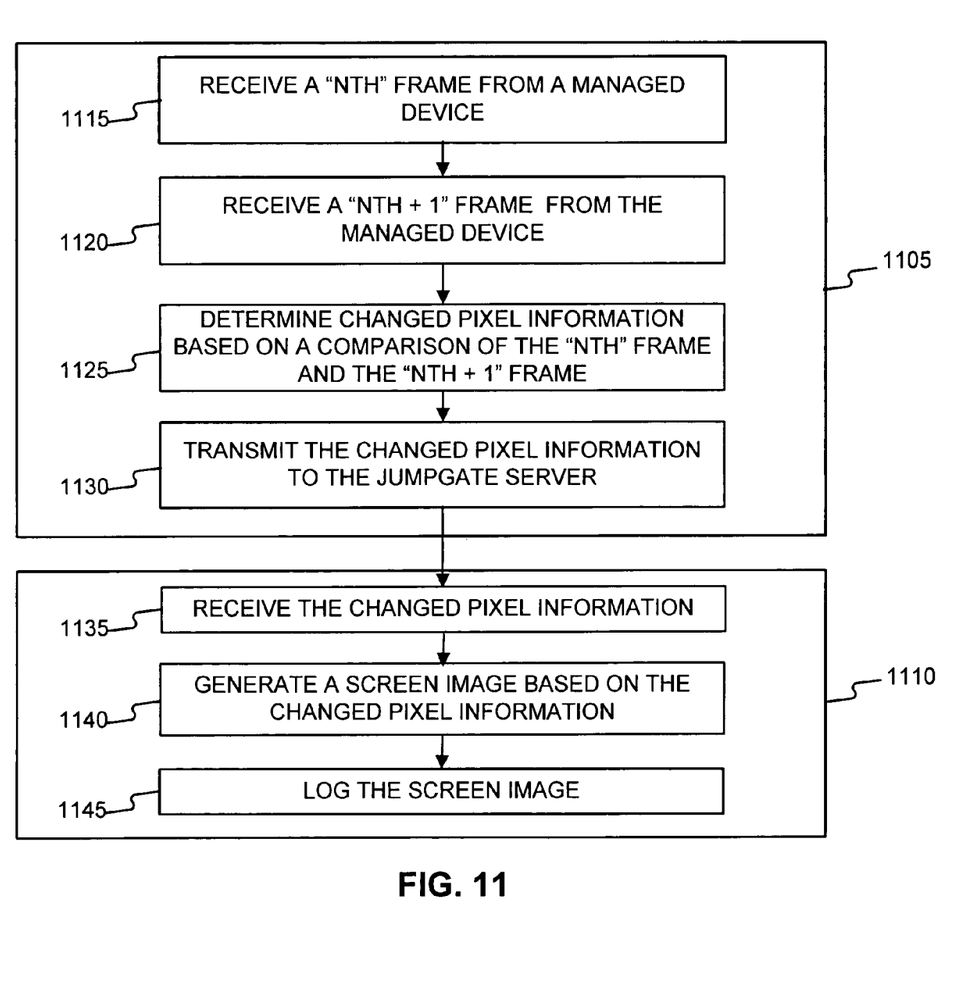
FIG. 11 is a flow diagram of a process for communicating between an appliance and a management server, according to an embodiment of the invention.

FIG. 11 is a flow diagram of a process for communicating between an appliance and a management server according to an embodiment of the invention. FIG. 11 illustrates a step 1105 for generating the compressed video screen information, which may be performed in the CTA 120. FIG. 11 also shows subsequent processing steps 1110 that are preferably performed in the jumpgate server 745.

As shown in FIG. 11, the process begins in step 1115 by receiving an $N^{th}$ frame of computer video screen data from a managed device. Next, in step 1120, the process receives an $N^{th}+1$ frame from the managed device. The $N^{th}+1$ frame is a next or subsequent frame of computer video screen data with respect to the $N^{th}$ frame. Then, in step 1125, the process determines changed pixel information based on a comparison of the $N^{th}$ frame and the $N^{th}+1$ frame. The process transmits the changed pixel information to the jumpgate server 745 in step 1130.

Turning now to step 1110, the process receives the changed pixel information in step 1135, generates a screen image based on the changed pixel information in step 1140, then logs the screen image in step 1145. The screen information logged in step 1145 compliments the user action and application data logged in data log step 960, providing improved auditability and accountability for activity related to network management resources.

The embodiments of the invention described above may be used separately or in any combination, according to design choice. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for managing a network, comprising:
   a management server;
   a customer appliance;
   an interface to a managed device coupled to the customer appliance;
   a customer firewall coupled to the customer appliance and the managed device, such that the customer appliance and the managed device are coupled to a first link via the customer firewall; and
   a management firewall coupled to the management server, such that the management server is coupled to the first link via the management firewall; wherein,
   the first link is configured to transmit a low bandwidth signal between the management server and the customer appliance,
   the customer appliance receives a Nth frame of data and a Nth+1 frame of data from the managed device, determines changed pixel information based on a comparison of the Nth frame of data and a Nth+1 frame of data and transmits the changed pixel information to the management server, and
   the management server receives the changed pixel information from the customer appliance, generates a screen image based on the changed pixel information and logs the screen image.

2. The system of claim 1, further comprising at least one user console coupled to the management server, the at least one user console including a viewer for communicating with the management server.

3. The system of claim 2, wherein the user console includes a graphical user interface (GUI), the GUI having a customer list window and a device list window, the device list window configured to display a list of devices associated with selection of a customer in the customer list window.

4. The system of claim 3, the GUI having a device information window, the device information window configured to display information associated with a device selected in the device list window.

5. The system of claim 1, wherein the customer appliance is in a Demilitarized Zone (DMZ) with respect to the customer firewall.

6. The system of claim 1, wherein the management server includes a launcher application, the customer appliance configured to reject remote login from other than the management server.

7. The system of claim 1, wherein the low bandwidth signal comprises input/output (I/O) command signals including at least one of a keyboard-generated signal and a mouse-generated signal transmitted from the management server to the customer appliance.

8. The system of claim 1, wherein the low bandwidth signal comprises compressed computer video screen information including changed pixel information transmitted from the customer appliance to the management server.

9. A method for processing data, comprising:
   a customer appliance:
      receiving a Nth frame of data from a managed device;
      receiving a Nth+1 frame of data from the managed device;
      determining changed pixel information based on a comparison of the Nth frame and the Nth+1 frame; and
      transmitting the changed pixel information to a management server, wherein,
   an interface to a managed device is coupled to the customer appliance,
   a customer firewall is coupled to the customer appliance and the managed device, such that the customer appliance and the managed device are coupled to a first link via the customer firewall, and
   a management firewall is coupled to the management server, wherein the management firewall is coupled to the customer firewall via the first link.

10. The method of claim 9, further comprising receiving input/output (I/O) command signals in the customer appliance from the management server.

11. A processor-readable medium, the processor-readable medium having instructions stored thereon, the instructions configured to perform a method for managing data over a network, the method comprising:
   a customer appliance:
      receiving a Nth frame of data from a managed device;
      receiving a Nth+1 frame of data from the managed device;
      determining changed pixel information based on a comparison of the Nth frame and the Nth+1 frame; and
      transmitting the changed pixel information to a management server,
   wherein,
   an interface to a managed device is coupled to the customer appliance,
   a customer firewall is coupled to the customer appliance and the managed device, such that the customer appliance and the managed device are coupled to a first link via the customer firewall, and
   a management firewall is coupled to the management server, wherein the management firewall is coupled to the customer firewall via the first link.

12. The processor-readable medium of claim 11, the method further comprising receiving input/output (I/O) command signals in the customer appliance from the management server.

13. A method for processing data in a management server, comprising:
   a management server:

receiving changed pixel information from a customer appliance, the changed pixel information being based on a comparison of an Nth frame of data and an Nth+1 frame of data;

generating a screen image based on the changed pixel information; and logging the screen image, wherein, an interface to a managed device is coupled to the customer appliance, a customer firewall is coupled to the customer appliance and the managed device, such that the customer appliance and the managed device are coupled to a first link via the customer firewall, and a management firewall is coupled to the management server, wherein the management firewall is coupled to the customer firewall via the first link.

14. A processor-readable medium, the processor-readable medium having instructions stored thereon, the instructions configured to perform a method for processing data in a management server, the method comprising:

a management server:

receiving changed pixel information from a customer appliance, the changed pixel information being based on a comparison of an Nth frame of data and an Nth+1 frame of data;

generating a screen image based on the changed pixel information; and logging the screen image, wherein, an interface to a managed device is coupled to the customer appliance, and a firewall is coupled to the customer appliance and the managed device, such that the customer appliance and the managed device are coupled to a first link via the firewall, and the firewall is coupled to the management server via the first link.

* * * * *